(12) United States Patent
Gao et al.

(10) Patent No.: US 12,511,157 B2
(45) Date of Patent: Dec. 30, 2025

(54) METHOD, APPARATUS AND SYSTEM FOR PROCESSING DATA, ELECTRONIC DEVICE, AND COMPUTER READABLE MEDIUM

(71) Applicant: Beijing Baidu Netcom Science Technology Co., Ltd., Beijing (CN)

(72) Inventors: Peng Gao, Beijing (CN); Shaoqing Guo, Beijing (CN); Zhensheng Yang, Beijing (CN); Wei Guo, Beijing (CN); Pengju Xing, Beijing (CN); Chaoqian Liuzeng, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 683 days.

(21) Appl. No.: 17/884,860

(22) Filed: Aug. 10, 2022

(65) Prior Publication Data
US 2022/0382585 A1 Dec. 1, 2022

(30) Foreign Application Priority Data
Dec. 23, 2021 (CN) .......................... 202111589952.8

(51) Int. Cl.
*G06F 9/48* (2006.01)
*G06F 9/54* (2006.01)

(52) U.S. Cl.
CPC ............ *G06F 9/4881* (2013.01); *G06F 9/546* (2013.01)

(58) Field of Classification Search
None
See application file for complete search history.

(56) References Cited

U.S. PATENT DOCUMENTS

| 10,169,757 | B1* | 1/2019 | Vippagunta | G06F 16/43 |
| 2011/0289479 | A1* | 11/2011 | Pletter | G06F 16/27 |
| | | | | 717/122 |
| 2015/0229613 | A1* | 8/2015 | Baum | H04L 63/061 |
| | | | | 713/171 |
| 2018/0150325 | A1 | 5/2018 | Kuo | |

(Continued)

FOREIGN PATENT DOCUMENTS

| CN | 110263104 A | * | 9/2019 | ........... G06F 16/258 |
| CN | 111651464 A | | 9/2020 | |
| CN | 112667414 A | | 4/2021 | |

(Continued)

*Primary Examiner* — Charles E Anya
(74) *Attorney, Agent, or Firm* — ICE MILLER LLP; Justin D. Swindells

(57) ABSTRACT

The present disclosure provides a system for processing data. A specific implementation is as follows: a control server acquires, based on a preset scheduling strategy, a second puller from the first puller, and a second task execution manager from the first task execution manager; and controls the second puller and the second task execution manager to perform an operation; a second puller acquires data of a to-be-processed message in a message queue; serializes the data of the to-be-processed message to obtain to-be-stored data; stores the to-be-stored data into a database to obtain stored first data; and adds a data state of the first data to the database; and a second task execution manager acquires second data from the database, and executes a task corresponding to the second data; and updates the data state based on a task execution result of the second data.

7 Claims, 4 Drawing Sheets

(56) References Cited

U.S. PATENT DOCUMENTS

2020/0104387 A1* 4/2020 Sirajuddin ............ G06F 16/211

FOREIGN PATENT DOCUMENTS

| CN | 113010283 A | 6/2021 |
| CN | 113127158 A | 7/2021 |
| CN | 113535420 A | 10/2021 |
| CN | 113791917 A | 12/2021 |

* cited by examiner

METHOD, APPARATUS AND SYSTEM FOR PROCESSING DATA, ELECTRONIC DEVICE, AND COMPUTER READABLE MEDIUM

CROSS-REFERENCE TO RELATED APPLICATIONS

This application claims priority to Chinese Patent Application No. 202111589952.8, filed with the China National Intellectual Property Administration (CNIPA) on Dec. 23, 2021, the contents of which are incorporated herein by reference in their entirety.

TECHNICAL FIELD

The present disclosure relates to the field of computer technology, specifically to the fields of technologies such as a data processing technology and a cloud service technology, and particularly to a method, apparatus and system for processing data, an electronic device, a computer readable medium and a computer program product.

BACKGROUND

When data in a message queue is processed, it is required to pull message data in the message queue for processing. In the logic of pulling a message for processing, the pulling and the processing are integrated, that is, the message pulling and an message execution are combined into one step, and thus, it is unable to perform an independent expansion according to the resource required during the pulling or processing.

SUMMARY

A method, apparatus and system for processing data, an electronic device, a computer readable medium and a computer program product are provided.

In a first aspect, embodiments of the present disclosure provide a system for processing data, comprising: a control server, a first puller and a first task execution manager, wherein the control server acquires a second puller from the first puller based on a preset scheduling strategy; acquires a second task execution manager from the first task execution manager based on the preset scheduling strategy; and controls the second puller and the second task execution manager to perform an operation; the second puller acquires data of a to-be-processed message in a message queue; serializes the data of the to-be-processed message to obtain to-be-stored data; stores the to-be-stored data into a database to obtain stored first data; and adds a data state of the first data to the database; the second task execution manager acquires second data from the database, and executes a task corresponding to the second data, a data state corresponding to the second data being a to-be-processed state, and the first data comprising the second data; and updates the data state based on a task execution result of the second data.

In a second aspect, embodiments of the present disclosure provide a method for processing data, comprising: acquiring second data from a database, a data state corresponding to the second data being a to-be-processed state; executing a task corresponding to the second data; and updating the data state based on a task execution result of the second data.

In a third aspect, embodiments of the present disclosure provide another method for processing data, comprising: acquiring data of a to-be-processed message in a message queue; acquiring, in response to the data of the to-be-processed message being non-relational data, a type of the data of the to-be-processed message; serializing the data of the to-be-processed message to obtain to-be-stored data; adding a key value to the to-be-stored data based on the type; storing the to-be-stored data after the adding into a database, to obtain stored first data; and adding a data state of the first data to the database.

In a fourth aspect, embodiments of the present disclosure provide an apparatus for processing data, comprising: a state acquiring unit, configured to acquire second data from a database, a data state corresponding to the second data being a to-be-processed state; a data pulling unit, configured to execute a task corresponding to the second data; and a state changing unit, configured to update the data state based on a task execution result of the second data.

In a fifth aspect, embodiments of the present disclosure provide another apparatus for processing data, comprising: a data acquiring unit, configured to acquire data of a to-be-processed message in a message queue; a type acquiring unit, configured to acquire, in response to the data of the to-be-processed message being non-relational data, a type of the data of the to-be-processed message; a serializing unit, configured to serialize the data of the to-be-processed message to obtain to-be-stored data; a key value adding unit, configured to add a key value to the to-be-stored data based on the type; an obtaining unit, configured to store the to-be-stored data after the adding into a database, to obtain stored first data; and a state adding unit, configured to add a data state of the first data to the database.

In a sixth aspect, embodiments of the present disclosure provide an electronic device, comprising: one or more processors; and a memory, storing one or more programs, wherein the one or more programs, when executed by the one or more processors, cause the one or more processors to implement the method provided by the second or third aspect.

In a seventh aspect, embodiments of the present disclosure provide a computer-readable medium, storing a computer program thereon, wherein the program, when executed by a processor, causes the processor to implement the method provided by the second or third aspect.

In a eighth aspect, an embodiment of the present disclosure provides a computer program product, comprising a computer program, wherein the computer program, when executed by a processor, implements the method provided by the second or third aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
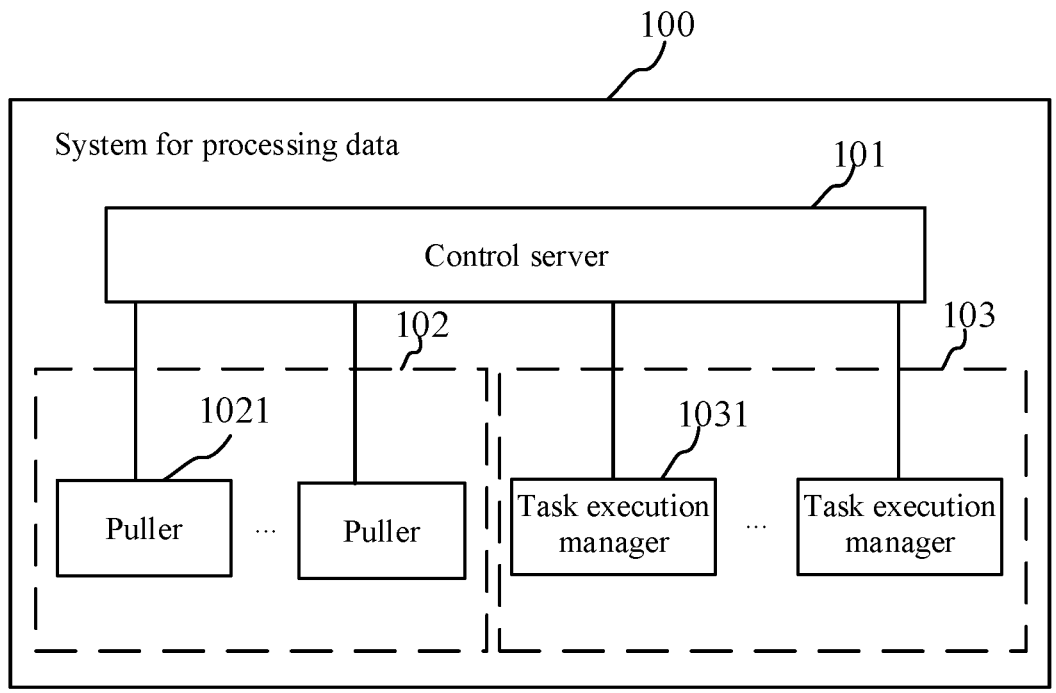
FIG. 1 is a schematic structural diagram of an embodiment of a system for processing data according to the present disclosure

FIG. 1 is a schematic structural diagram 100 of an embodiment of a system for processing data according to the present disclosure, and the above system for processing data includes a control server 101, a first puller 102 and a first task execution manager 103.

In this embodiment, the control server 101 respectively communicates with the first puller 102 and the first task execution manager 103, to acquire a second puller 1021 from the first puller 102 based on a preset scheduling strategy, and acquire a second task execution manager 1031 from the first task execution manager 103 based on the preset scheduling strategy; and controls the second puller 1021 and the second task execution manager 1031 to perform an operation.

In this embodiment, the first puller 102 includes a plurality of pullers, the second puller 1021 is one puller in the first puller, and the control server 101 acquires the second puller based on the preset scheduling strategy. The first task execution manager 103 includes a plurality of task execution managers, each of which may be connected with at least one executor for executing a task, and the second task execution manager 1031 is one task execution manager in the first task execution manager 103. The task execution manager is a component of a management executor, and through the task execution manager, stored second data of a task corresponding to the executor can be sent to the executor.

In this embodiment, the second puller 1021 acquires data of a to-be-processed message in a message queue; serializes the data of the to-be-processed message to obtain to-be-stored data; stores the to-be-stored data into a database to obtain stored first data; and add a data state of the first data to the database.

In this embodiment, the message queue is an important component in a distributed system, and this component is applied when there is no need to obtain a result immediately, but an amount of concurrency needs to be controlled. The message queue mainly solves the problem such as application coupling, asynchronous processing, and traffic peak cutting. The message queues may reside in a memory or on a magnetic disk, and the message stored on the message queue may be read directly by an application program. Thus, through the message queue, the application program may be executed independently.

In this embodiment, the message queue has a plurality of messages, and the second puller 1021 acquires the data of the to-be-processed message from the message queue through a data protocol or the like. The data of the to-be-processed message is data related to a specific task. When a different task is performed, the data of a to-be-processed message related to the task can be acquired from the message queue. For example, at the time of domain name transfer and real name verification, an executing body on which a method for processing data runs may pull, by communicating with a registry, the data of the to-be-processed message in the message queue of the registry, thereby actively pulling mechanism synchronization information from the registry.

In this embodiment, the serializing refers to a process in which an object (variable) or any type of data structure from a memory is changed to a storable object or the object (variable) or any type of data structure is transmitted. The data of the to-be-processed message is the data stored in the memory. In order to convert the data of the to-be-processed message into the data that can be stored in the database, it is required to serialize the to-be-processed message.

In this embodiment, serializing on the data of the to-be-processed message includes: converting the data of the to-be-processed message into an object that can be stored in the database according to a preset serialization protocol, where the object that can be stored in the database is the to-be-stored data.

In this embodiment, the to-be-stored data is the same as the data content of the stored first data, but only different in the representations thereof. The to-be-stored data is data that can be identified by the database, the first data is data that is persisted into the database, and the structure of the first data is the same as the storage structure of the data in the database.

In this embodiment, the type of the database may be any arbitrary relational database, for example, Access, MySQL, and BD2. According to the storage structure of the database, the first data may be various types of data, for example, data of a relational data type or a non-relational type.

In this embodiment, the data in the database can be used to implement different tasks, and the representations of the tasks vary depending on business requirements, for example, a domain name transfer task. Further, the specific implementation of a task needs to be performed by an executor, and different types of executors execute corresponding types of tasks. The data state of the first data is used to indicate the state of the first data during the execution of the task. For example, after the to-be-stored data is persistently stored into the database, the stored first data is obtained. At this time, the task has not been executed, and thus, the data state of the stored data can be marked as to-be-processed. Further, the second task execution manager 1031 may select the second data from a plurality of pieces of first data of which the data states are marked as to-be-processed, for executing the task.

In this embodiment, the second task execution manager 1031 acquires the second data from the database, and executes a task corresponding to the second data, the data state corresponding to the second data being a to-be-processed state, and the first data including the second data, and updates the data state based on a task execution result of the second data.

In this embodiment, an executor connected with the second task execution manager 1031 executes the corresponding task based on the obtained second data, and feeds back the task execution result to the second task execution manager 1031. The task execution result may include successful task execution, failed task execution, continuing trying, and the like.

In this embodiment, the second task execution manager 1031 updates the data state of the second data in the database according to the task execution result fed back by the executor. For example, before the task is executed, the data state of the second data is to-be-processed. When determining, by communicating with the executor, that the execution for the task corresponding to the second data has been completed, the second task execution manager 1031 marks the data state of the second data as successful processing.

In this alternative implementation, the data state corresponds to the task execution result. When the task execution is successful, the task execution manager updates the data state of the second data from to-be-processed to successful processing. When the task execution is failed, the task execution manager may update the data state of the second data from to-be-processed to failed processing. When the task needs to be repeatedly executed, the task execution manager may change the data state of the second data from to-be-processed to continuing trying.

At the time of the domain name transfer and the domain name real name verification, the registry actively pulls the mechanism synchronization information to the second puller. The second puller and the second task execution manager cooperate to implement a multi-processor system for processing data that pulls information for processing with fault tolerance.

In this embodiment, the time at which the control server 101 selects the second puller and the time at which the control server 101 selects the second task execution manager may be different. For example, when it is required to extract the data of the to-be-processed message in the message queue, the puller is selected. When it is required to process different tasks, the task execution manager is selected. Correspondingly, at least one executor connected with the second task execution manager can be determined.

The system for processing data provided in the embodiment of the present disclosure includes the control server, the first puller and the first task execution manager. The control server acquires the second puller from the first puller based on the preset scheduling strategy, and acquires the second task execution manager from the first task execution manager based on the preset scheduling strategy; and controls the second puller and the second task execution manager to perform the operation. The second puller acquires the data of the to-be-processed message in the message queue; serializes the data of the to-be-processed message to obtain the to-be-stored data; stores the to-be-stored data into the database to obtain the stored first data; and adds the data state of the first data to the database. The second task execution manager acquires the second data from the database, and executes the task corresponding to the second data, the data state corresponding to the second data being the to-be-processed state, and the first data including the second data; and updates the data state based on the task execution result of the second data. Accordingly, by marking the data state of the first data in the database, a data state record is provided for the execution manager, which may cause the execution manager to execute a task based on the data state of the stored data and update the data state. Moreover, a separation condition is provided for the extraction and processing for the data of the message queue. By adopting the execution manager to independently execute the task, a condition is provided for the independent expansion at the time of data pulling or data processing, thereby ensuring the separability of the data pulling and the data processing, and improving the efficiency of processing the data of the message queue.

In some alternative implementations of this embodiment, the second task execution manager 1031 performs a deserialization on the second data; and sends data after the deserialization is completed to an executor connected with the task execution manager, and receives a task execution result fed back by the executor.

In the alternative implementations, the second task execution manager 1031 performs the deserialization on the second data to obtain a memory object. The deserialization refers to converting the data stored in the database into a memory object according to an object state and description information saved in the database. The second task execution manager 1031 sends the memory object to the executor connected therewith, and the executor executes a corresponding task based on the obtained memory object.

In the alternative implementations, the task execution manager sends the data after the deserialization on the second data is completed to the executor, receives the task execution result fed back by the executor, and may update the data state of the first data stored in the database based on the execution result, thereby ensuring the reliability of the task execution.

In data processing, various types of data need to be processed, for example, an initiation of a domain name transfer, a termination of the domain name transfer, and a success of the domain name transfer, and different operations need to be performed on different task results. When non-relational data is stored in a relational database, such information is generally not of a particular type or is data corresponding to a plurality of types. These data is generally serialized using some particular serialization protocols (e.g., json and xml) and then stored into the database. At the time of the deserialization of the data, the type of the deserialized data needs to be specified to be read into the memory. At this time, if the stored type before the data is serialized is not uniform, the data cannot be deserialized and used in sequence. A second determination or forcible conversion needs to be performed according to a specific business scenario, resulting in poor operation experience. In an other embodiment of the present disclosure, when the data of the to-be-processed message is non-relational data, the second puller acquires the type of the data of the to-be-processed message; and adds a key value to the to-be-stored data based on the type. The second task execution manager acquires the key value before the deserialization on the second data, acquires the type of to-be-stored data based on the key value, and sends, after the deserialization on the second data, data carrying the type after the deserialization is completed to the executor connected with the second task execution manager.

In this embodiment, the type of a serialized object (the data of the to-be-processed message) is first acquired before or during the serialization, and then an additional key value is added during the serialization of the object. The key value records the specific type of the current object, and then is stored into the database.

When the second data is acquired from the database for use, the key value added at the time of serialization is first acquired before the deserialization, then a reflection is performed according to the key value to acquire the specific type, and then, the acquired type is used to annotate the data after the deserialization, thereby effectively indicating the type of the data after the deserialization.

According to the method for processing data provided in the embodiment of the present disclosure, the key value through which the type of the data can be obtained is added to the to-be-stored data, which provides a reliable type guidance when the task execution manager deserializes the stored data.

In some alternative implementations of this embodiment, the preset scheduling strategy includes any one of random, polling, and sharding broadcast.

In the alternative implementations, random means that a puller is randomly selected from the first puller 102 connected with the control server 101 as the second puller 1021, and a task execution manager is randomly selected from the first task execution manager 103 connected with the control server 101 as the second task execution manager 1031. Polling means that the pullers in the first puller 102 will be executed in sequence, each executed puller being used as the second puller 1021, and the task execution managers in the first task execution manager 103 will be executed in sequence, and each executed task execution manager being used as the second task execution manager 1031. Sharding broadcast means that the pullers in the first puller 102 are divided into a plurality of independent subblocks, and the subblocks are processed by a dedicated node of a shard area, thus obtaining the second puller from the subblocks of the puller. Sharding broadcast means that the first task execution manager 103 is divided into a plurality of independent subblocks, and the subblocks are processed by a dedicated node of a shard area, thus obtaining the second task execution manager 1031 from the subblocks of the task execution manager.

The scheduling strategies provided in the alternative implementations provide many alternative means for acquiring the second puller and the second task execution manager, ensuring the reliability of selecting the puller and the task execution manager.

Alternatively, the preset scheduling strategy may further include: extracting, based on the resource occupancy of the each puller in the first puller 102, a puller having a minimum resource occupancy as the second puller; and extracting, based on the resource occupancy of the each task execution manager in the first task execution manager 103, a task execution manager having a minimum resource occupancy as the second task execution manager 1031.

According to the system for processing data provided in this embodiment, the first puller and the first task execution manager are independently provided. Based on the network transmission requirement of the first puller and the message queue, the network bandwidth resource of the each puller can be improved. Based on the memory requirement by the connection between the first task execution manager and the executor, the memory resource of the task execution manager can be improved. Accordingly, the puller and the task execution manager can be respectively and independently expanded according to the resource respectively required by the puller and the task execution manager. Further, the first puller and the first task execution manager are independently controlled, and the data processing logics are separated, which is conducive to the management of the message processing.

According to the system for processing data provided in this embodiment, through the configuration of the first puller and the first task execution manager, the separation of the pulling and processing of the data in the message queue is realized, and a reliable basis is provided for the expansion of the puller and the expansion of the task manager. When the data of the to-be-processed message in the message queue is processed, the control server is used to select the second puller and the second task execution manager, which implementing a balanced selection for a plurality of pullers and a plurality of task managers, thereby improving the data processing efficiency.

Alternatively, before serializing the data of the to-be-processed message, the second puller 1021 may perform data cleaning or data screening on the data of the to-be-processed message, to remove invalid data from the data of the to-be-processed message. By performing the data cleaning or data screening on the data of the to-be-processed message, the validity of the data of the to-be-processed message is ensured.

Figure 2:
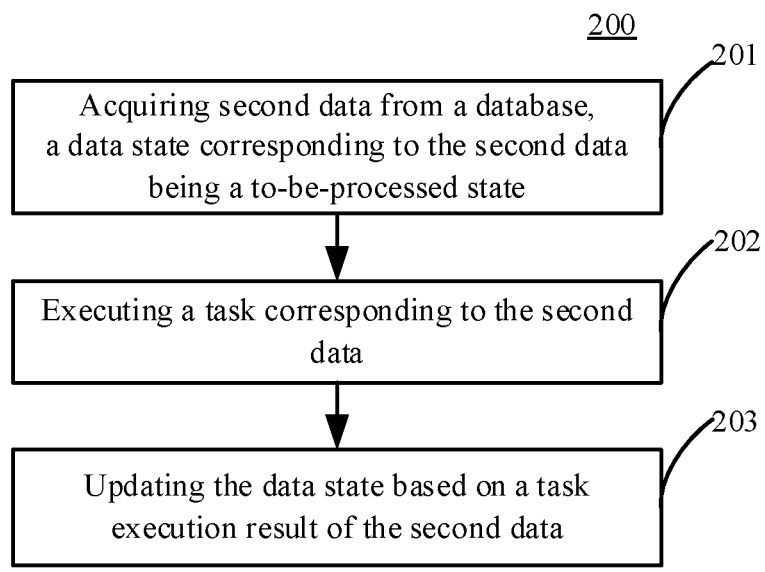
FIG. 2 is a flowchart of an embodiment of a method for processing data according to the present disclosure.

FIG. 2 illustrates a flow 200 of an embodiment of a method for processing data according to the present disclosure. The above method for processing data includes the following steps:

Step 201, acquiring second data from a database, a data state corresponding to the second data being a to-be-processed state.

In this embodiment, an executing body on which the method for processing data runs is a task execution manager. The task execution manager can control many different types of executors, and the many different types of executors can execute corresponding types of tasks based on deserialized data (a memory object) issued by the task execution manager.

The second data in the database may be the data of the to-be-processed message that is pulled from the message queue in the embodiment shown in FIG. 1. The data of the to-be-processed message is serialized and then stored into the database, thus obtaining data in first data. The data state of the second data is used to indicate the state of the second data during the execution of the task. At this time, the task corresponding to the second data has not been executed, and thus, the data state of the second data is marked as to-be-processed.

In this embodiment, the data state of the first data in the database is related to the execution state of the task corresponding to the first data. Depending on whether the task is completed, the data state of the first data may include: to-be-processed, completed processing, failed processing, and continuing executing. The data in the first data of which the data state is to-be-processed is the second data. Alternatively, during the execution of the task, the data state of the first data may further include: being processed.

Step 202, executing a task corresponding to the second data.

In this embodiment, the executing a task corresponding to the second data includes: determining a task type based on a type of the second data, determining an executor corresponding to the second data according to the task type, deserializing the second data into a memory object, and controlling the executor to execute the corresponding task based on the memory object. In this embodiment, when it is required to add a different type of data of the to-be-processed message or a different type of second data subsequently, it is only required to add a corresponding executor, thereby improving the convenience of the executor in expansion.

Alternatively, the executing a task corresponding to the second data includes: querying the corresponding task based on the second data, performing a deserialization on the second data to obtain data after the deserialization is completed, and sending the data after the deserialization is completed to the executor corresponding to the task.

Step 203, updating the data state based on a task execution result of the second data.

In this embodiment, the executing body on which the method for processing data runs changes the data state of the second data to a state corresponding to the task execution result based on a task execution result fed back by each executor.

Specifically, the task execution result includes: a successful task execution, a failed task execution, and continuing trying. When the task execution result is the successful task execution, the executing body changes the data state from to-be-processed or being processed to successful processing. When the task execution fails, the executing body changes the data state from to-be-processed or being processed to failed processing. When the task needs to be continued, the executing body changes the data state from to-be-processed or being processed to continuing trying.

According to the method for processing data provided in this embodiment, the second data is acquired from the database, the data state corresponding to the second data being the to-be-processed state, the task corresponding to the second data is executed, and the data state is updated based on the task execution result of the second data. Accordingly, the serialized data pulled from the message queue can be independently processed, thereby improving the processing efficiency and the expandability of the processor for data processing.

In some alternative implementations of this embodiment, the executing a task corresponding to the second data includes: performing the deserialization on the second data; and sending the data after the deserialization is completed to the executor, and receiving the task execution result fed back by the executor.

In the alternative implementations, after the second data is obtained, the second data is deserialized, the data after the deserialization is completed is sent to the executor, and the task execution result of the executor is received. When the task is executed according to the task execution result of the second data, many different types of data can be handed over to different executors to execute the task independently, thereby improving data expansibility.

In another embodiment of the present disclosure, the method further includes: acquiring a key value in the second data; acquiring a type of to-be-stored data based on the key value; and sending data carrying the type after the deserialization is completed to the executor, after the deserialization on the second data.

In this embodiment, when the data required to be stored for relational data is non-relational, an extractor may first acquire the type of the data of the to-be-processed message, after extracting the data of the to-be-processed message from the message queue. The type may be the type (e.g., an integer type, and a floating-point type) of the data of the to-be-processed message in a task. Based on the type, the key value is added to the to-be-stored data stored in the database. The key value is information including a type, and the type can be obtained through the key value.

The executing body on which this embodiment operates performs the deserialization processing on the second data (to which the key value is added), and obtains the data after the deserialization is completed, after the deserialization processing is completed. According to the obtained type, the data carrying the type after the deserialization is completed is sent to the executor.

In this embodiment, there is no need to perform the deserialization on the type, but the deserialization result carries the type by itself. There is no need for a second forcible conversion or a second deserialization, thereby improving the task execution efficiency.

Figure 3:
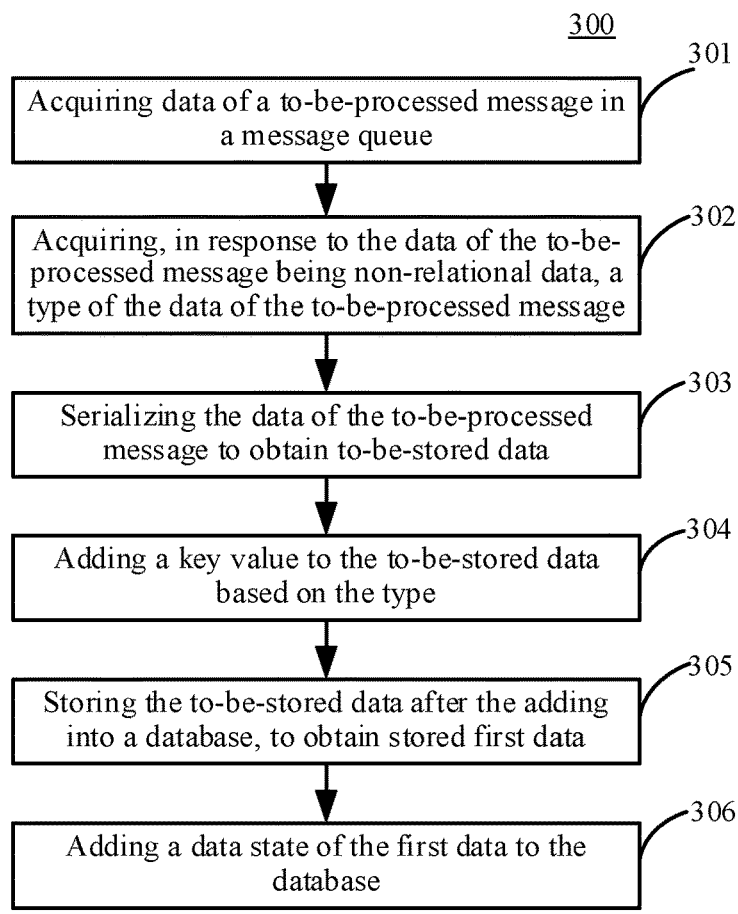
FIG. 3 is a flowchart of another embodiment of the method for processing data according to the present disclosure.

FIG. 3 illustrates a flow 300 of an embodiment of the method for processing data according to the present disclosure. The above method for processing data includes the following steps:

Step 301, acquiring data of a to-be-processed message in a message queue.

In this embodiment, the message queue is an important component in a distributed system, and this component is applied when there is no need to obtain a result immediately, but an amount of concurrency needs to be controlled. The message queue mainly solves the problem such as application coupling, asynchronous processing, and traffic peak cutting. The message queues may reside in a memory or on a magnetic disk, and the message stored on the message queue may be read directly by an application program. Thus, through the message queue, the application program may be executed independently.

In this embodiment, the message queue has a plurality of messages, and an executing body on which the method for processing data runs may acquire the data of the to-be-processed message from the message queue through a data protocol or the like. The data of the to-be-processed message is data related to a specific task. When a different task is performed, the data of a to-be-processed message related to the task can be acquired from the message queue. For example, at the time of domain name transfer and real name verification, the executing body on which the method for processing data runs may acquire, by communicating with a registry, the data of the to-be-processed message in the message queue of the registry, thereby actively acquiring mechanism synchronization information from the registry.

Step 302, acquiring, in response to the data of the to-be-processed message being non-relational data, a type of the data of the to-be-processed message.

In this embodiment, when the data required to be stored for relational data is non-relational, an extractor may first acquire the type of the data of the to-be-processed message, after extracting the data of the to-be-processed message from the message queue. The type may be the type (e.g., an integer type, and a floating-point type) of the data of the to-be-processed message in a task.

Step 303, serializing the data of the to-be-processed message to obtain to-be-stored data.

The serializing refers to a process in which an object (variable) or any type of data structure from a memory is changed to a storable object or the object (variable) or any type of data structure is transmitted. The data of the to-be-processed message is the data stored in the memory. In order to convert the data of the to-be-processed message into the data that can be stored in the database, it is required to serialize the to-be-processed message.

In this embodiment, the serializing the data of the to-be-processed message includes: converting the data of the to-be-processed message into an object that can be stored in the database according to a preset serialization protocol. The object that can be stored in the database is the to-be-stored data.

Alternatively, before the data of the to-be-processed message is serialized, data cleaning or data screening is performed on the data of the to-be-processed message, to remove invalid data from the data of the to-be-processed message. By performing the data cleaning or data screening on the data of the to-be-processed message, the validity of the data of the to-be-processed message is ensured.

Step 304, adding a key value to the to-be-stored data based on the type.

In this embodiment, the key value is added to the to-be-stored data based on the type. The key value includes a key identifier and type information corresponding to the key identifier. The key value is information including the type, and the type can be obtained through the key value.

Step 305, storing the to-be-stored data after the adding into a database, to obtain stored first data.

In this embodiment, after obtaining the to-be-stored data, the executing body on which the method for processing data runs directly stores the to-be-stored data into the database to obtain the stored first data actually stored in the database.

It should be noted that the to-be-stored data is the same as the data content of the first data, but only different in the representations thereof. The to-be-stored data is data that can be identified by the database, the first data is data that is persisted into the database, and the structure of the first data is the same as the storage structure of the data in the database.

In this embodiment, the type of the database may be any arbitrary relational database, for example, Access, MySQL, and BD2.

In this embodiment, according to the storage structure of the database, the stored data may be various types of data, for example, data of a relational data type or a non-relational type.

Step 306, adding a data state of the first data to the database.

In this embodiment, the first data in the database is used to implement different tasks, and the representations of the tasks vary depending on business requirements, for example, a domain name transfer task. Further, the specific implementation of a task needs to be performed by an executor, and different types of executors execute corresponding types of tasks. The data state of the first data is used to indicate the state of the first data during the execution of the task. For example, the executing body obtains the stored first data after persistently storing the to-be-stored data into the database. When the task has not been executed, the data state of the first data can be marked as to-be-processed. The first data of which the data state is to-be-processed is collectively referred to as second data.

In this embodiment, a task execution manager is a component managing at least one executor, and through the task execution manager, the second data of a task corresponding to each executor can be sent to the each executor.

In this embodiment, the task execution manager may further perform a deserialization on the second data to obtain a memory object. The deserialization refers to converting the second data in the database into a memory object according to an object state and description information saved in the database. The task execution manager sends the memory object to the executor connected therewith, and the executor executes a corresponding task based on the obtained memory object, and feeds back a task execution result to the task execution manager. The task execution result may include: a successful task execution, a failed task execution, and continuing trying.

In this embodiment, the task execution manager changes the data state of the second data in the database according to the task execution result fed back by the each executor. For example, before the task is executed, the data state of the second data is unprocessed. When determining, by communicating with the executor, that the execution for the task corresponding to the second data has been completed, the task execution manager marks the data state of the second data as successful processing.

The above task execution manager acquires the second data from the database based on the data state for executing a task, and updates the data state, which includes the following steps. In response to determining that the data state of the second data is unprocessed, the task execution manager acquires and deserializes the second data, and sends data after the deserialization is completed to the at least one executor; and changes the data state to a state corresponding to the task execution result based on the task execution result fed back by the each executor.

According to the method for processing data provided in this embodiment, first, the data of the to-be-processed message in the message queue is acquired; next, the type of the data of the to-be-processed message is acquired in response to the data of the to-be-processed message being non-relational data; next, the data of the to-be-processed message is serialized to obtain the to-be-stored data; next, the key value is added to the to-be-stored data based on the type; next, the to-be-stored data after the adding is stored into the database to obtain the stored first data; and finally, the data state of the first data is added to the database. Accordingly, by marking the data state of the first data in the database, a data state record is provided for the execution manager, which may cause the execution manager to execute a task based on the data state of the stored data and update the data state. Moreover, a separation condition is provided for the extraction and processing for the data of the message queue. By adopting the execution manager to independently execute the task, a condition is provided for the independent expansion at the time of data acquisition or data processing, thereby ensuring the separability of the data acquisition and the data processing, and improving the efficiency of processing the data of the message queue. In this embodiment, the to-be-stored data to which the key value is added is stored into the database to obtain the first data, which may cause the task execution manager to acquire the key value before the deserialization on the stored data, acquire the type of the to-be-stored data based on the key value, and send the data carrying the type after the deserialization is completed to the at least one executor after the stored data is deserialized. There is no need to perform the deserialization on the type, but the deserialization result carries the type by itself. There is no need for a second forcible conversion or a second deserialization, thereby improving the task execution efficiency.

Figure 4:
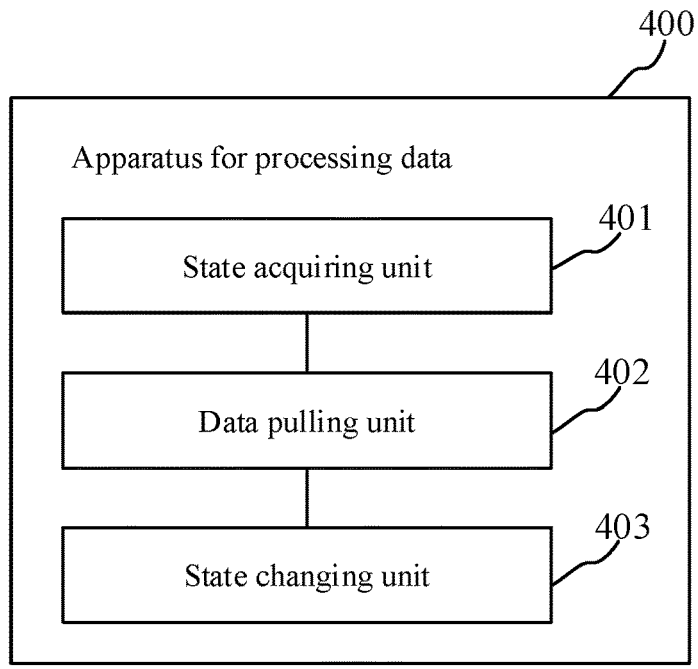
FIG. 4 is a schematic structural diagram of an embodiment of an apparatus for processing data according to the present disclosure.

Further referring to FIG. 4, as an implementation of the method shown in the above drawings, the present disclosure provides an embodiment of an apparatus for processing data. The embodiment of the apparatus corresponds to the embodiment of the method shown in FIG. 2.

As shown in FIG. 4, the apparatus 400 for processing data provided in this embodiment may include: a state acquiring unit 401, a data pulling unit 402 and a state changing unit 403. Here, the state acquiring unit 401 may be configured to acquire second data from a database, a data state corresponding to the second data being a to-be-processed state. The data pulling unit 402 may be configured to execute a task corresponding to the second data. The state changing unit 403 may be configured to update the data state based on a task execution result of the second data.

In this embodiment, for specific processes of the state acquiring unit 401, the data pulling unit 402 and the state changing unit 403 in the apparatus 400 for processing data, and their technical effects, reference may be respectively made to relative descriptions of step 201, step 202 and step 203 in the corresponding embodiment of FIG. 2, and thus the specific processes and the technical effects will not be repeated here.

In some alternative implementations of this embodiment, the data pulling unit 402 includes: a pulling module (not shown), a sending module (not shown) and a receiving module (not shown). Here, the pulling module may be configured to perform a deserialization on the second data. The sending module may be configured to send data after the deserialization is completed to an executor. The receiving module may be configured to receive a task execution result fed back by the executor.

In some alternative implementations of this embodiment, the apparatus 400 further includes: a key value acquiring unit (not shown), a type acquiring unit (not shown) and a data sending unit (not shown). Here, the key value acquiring unit may be configured to acquire a key value in the second data. The type acquiring unit may be configured to acquire a type of to-be-stored data based on the key value. The data sending unit may be configured to send data carrying the type after the deserialization is completed to the executor, after the deserialization on the second data.

According to the apparatus 400 for processing data provided in this embodiment, the state acquiring unit 401 acquires the second data from the database, the data state corresponding to the second data being the to-be-processed state, the data pulling unit 402 executes the task corresponding to the second data, and the state changing unit 403 updates the data state based on the task execution result of the second data. Accordingly, the serialized data pulled from the message queue can be independently processed, thereby improving the processing efficiency and the expandability of the processor for data processing.

Figure 5:
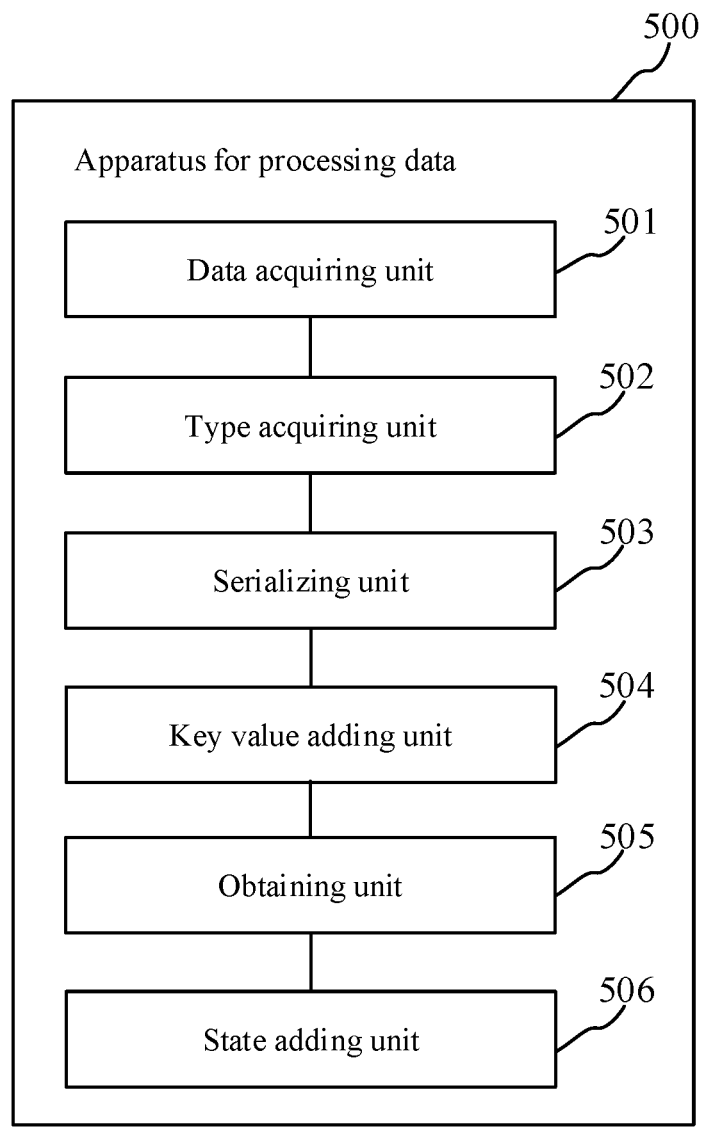
FIG. 5 is a schematic structural diagram of another embodiment of the apparatus for processing data according to the present disclosure.

Further referring to FIG. 5, as an implementation of the method shown in the above drawings, the present disclosure provides an embodiment of an apparatus for processing data. The embodiment of the apparatus corresponds to the embodiment of the method shown in FIG. 3.

As shown in FIG. 5, the apparatus 500 for processing data provided in this embodiment may include: a data acquiring unit 501, a type acquiring unit 502, a serializing unit 503, a key value adding unit 504, an obtaining unit 505 and a state adding unit 506. Here, the data acquiring unit 501 may be configured to acquire data of a to-be-processed message in a message queue. The type acquiring unit 502 may be configured to acquire, in response to the data of the to-be-processed message being non-relational data, a type of the data of the to-be-processed message. The serializing unit 503 may be configured to serialize the data of the to-be-processed message to obtain to-be-stored data. The key value adding unit 504 may be configured to add a key value to the to-be-stored data based on the type. The obtaining unit 505 may be configured to store the to-be-stored data after the adding into a database, to obtain stored first data. The state adding unit 506 may be configured to add a data state of the first data to the database.

In this embodiment, for specific processes of the data acquiring unit 501, the type acquiring unit 502, the serializing unit 503, the key value adding unit 504, the obtaining unit 505 and the state adding unit 506 in the apparatus 500 for processing data, and their technical effects, reference may be respectively made to relative descriptions of step 301, step 302, step 303, step 304, step 305 and step 306 in the corresponding embodiment of FIG. 3, and thus the specific processes and the technical effects will not be repeated here.

According to the apparatus for processing data provided in this embodiment, first, the data acquiring unit 501 acquires the data of the to-be-processed message in the message queue; next, the type acquiring unit 502 acquires, in response to the data of the to-be-processed message being the non-relational data, the type of the data of the to-be-processed message; next, the serializing unit 503 serializes the data of the to-be-processed message to obtain the to-be-stored data next, the key value adding unit 504 adds the key value to the to-be-stored data based on the type; next, the obtaining unit 505 stores the to-be-stored data after the adding into the database, to obtain the stored first data; and finally, the state adding unit 506 adds the data state of the first data to the database. Accordingly, by marking the data state of the first data in the database, a data state record is provided for the execution manager, which may cause the execution manager to execute a task based on the data state of the stored data and update the data state. Moreover, a separation condition is provided for the extraction and processing for the data of the message queue. By adopting the execution manager to independently execute the task, a condition is provided for the independent expansion at the time of data acquisition or data processing, thereby ensuring the separability of the data acquisition and the data processing, and improving the efficiency of processing the data of the message queue. In this embodiment, the to-be-stored data to which the key value is added is stored into the database to obtain the first data, which may cause the task execution manager to acquire the key value before the deserialization on the stored data, acquire the type of the to-be-stored data based on the key value, and send the data carrying the type after the deserialization is completed to the at least one executor after the stored data is deserialized. There is no need to perform the deserialization on the type, but the deserialization result carries the type by itself. There is no need for a second forcible conversion or a second deserialization, thereby improving the task execution efficiency.

In the technical solution of the present disclosure, the collection, storage, use, processing, transmission, provision, disclosure, etc. of the personal information of a user all comply with the provisions of the relevant laws and regulations, and do not violate public order and good customs.

According to an embodiment of the present disclosure, the present disclosure further provides an electronic device, a readable storage medium and a computer program product.

Figure 6:
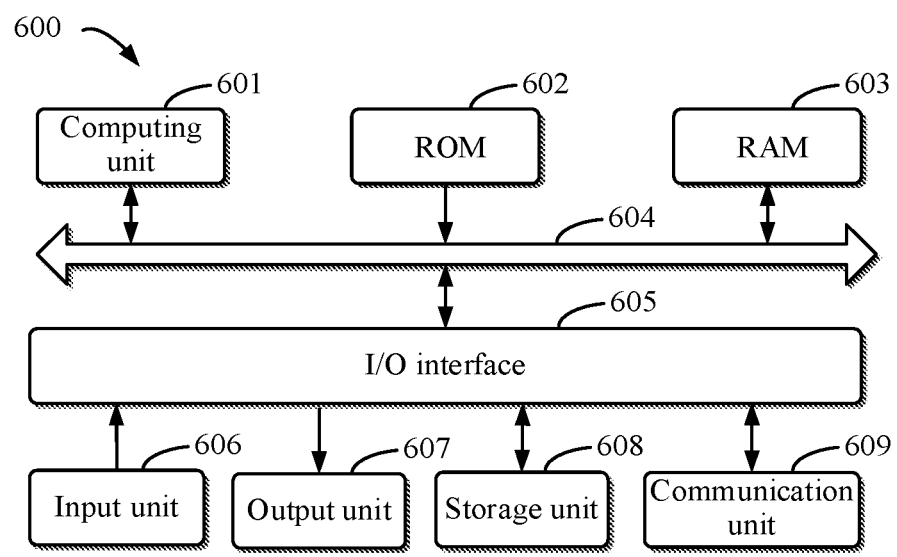
FIG. 6 is a block diagram of an electronic device used to implement the method for processing data according to the embodiments of the present disclosure.

FIG. 6 is a schematic block diagram of an example electronic device 600 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computation unit 601, which may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computation unit 601, the ROM 602 and the RAM 603 are connected to each other through a bus 604. An input/output (I/O) interface 605 is also connected to the bus 604.

The following components in the electronic device 600 are connected to the I/O interface 605: an input unit 606, for example, a keyboard and a mouse; an output unit 607, for example, various types of displays and a speaker; a storage device 608, for example, a magnetic disk and an optical disk; and a communication unit 609, for example, a network card, a modem, a wireless communication transceiver. The communication unit 609 allows the device 600 to exchange information/data with an other device through a computer network such as the Internet and/or various telecommunication networks.

The computation unit 601 may be various general-purpose and/or special-purpose processing assemblies having processing and computing capabilities. Some examples of the computation unit 601 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 601 performs the various methods and processes described above, for example, the method for processing data. For example, in some embodiments, the method for processing data may be implemented as a computer software program, which is tangibly included in a machine readable medium, for example, the storage device 608. In some embodiments, part or all of the computer program may be loaded into and/or installed on the device 600 via the ROM 602 and/or the communication unit 609. When the computer program is loaded into the RAM 603 and executed by the computation unit 601, one or more steps of the above method for processing data may be performed. Alternatively, in other embodiments, the computation unit 601 may be configured to perform the method for processing data through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include, being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A system for processing data, comprising:
a control server,
a first puller and
a first task execution manager,
wherein
the control server acquires a second puller from the first puller based on a preset scheduling strategy; acquires a second task execution manager from the first task execution manager based on the preset scheduling strategy; and controls the second puller and the second task execution manager to perform an operation;
the second puller acquires data of a to-be-processed message in a message queue; serializes the data of the to-be-processed message to obtain to-be-stored data; stores the to-be-stored data into a database to obtain stored first data; and adds a data state of the first data to the database;
the second task execution manager acquires second data from the database, and executes a task corresponding to the second data, a data state corresponding to the second data being a to-be-processed state, and the first data comprising the second data; and updates the data state based on a task execution result of the second data.

2. The system according to claim 1, wherein:
the second task execution manager performs a deserialization on the second data; and sends data after the deserialization is completed to an executor connected with the task execution manager, and receives a task execution result fed back by the executor.

3. The system according to claim 2, wherein:
when the data of the to-be-processed message is non-relational data, the second puller acquires a type of the data of the to-be-processed message; and adds a key value to the to-be-stored data based on the type; and
the second task execution manager acquires the key value before the deserialization on the second data, acquires a type of the to-be-stored data based on the key value, and sends data carrying the type after the deserialization is completed to the executor connected with the second task execution manager, after the deserialization on the second data.

4. The system according to claim 1, wherein the preset scheduling strategy comprises: any one of random, polling, and sharding broadcast.

5. A method for processing data, comprising:
acquiring second data from a database, a data state corresponding to the second data being a to-be-processed state;
executing a task corresponding to the second data; and
updating the data state based on a task execution result of the second data.

6. The method according to claim 5, wherein the executing a task corresponding to the second data comprises:
performing a deserialization on the second data; and
sending data after the deserialization is completed to an executor, and receiving a task execution result fed back by the executor.

7. The method according to claim 6, further comprising:
acquiring a key value in the second data;
acquiring a type of to-be-stored data based on the key value; and
sending data carrying the type after the deserialization is completed to the executor, after the deserialization on the second data.

* * * * *